United States Patent

[15] 3,653,692

Henson

[45] Apr. 4, 1972

[54] HOSE COUPLING METHOD AND MEANS

[72] Inventor: John W. Henson, 57 East Providencia, Burbank, Calif. 91502

[22] Filed: Feb. 9, 1970

[21] Appl. No.: 9,893

[52] U.S. Cl. ............................... 285/242, 29/235, 29/451, 285/259
[51] Int. Cl. ........................................................ F16l 33/00
[58] Field of Search .......................... 285/242, 259, 149, 305; 29/451, 235, 420

[56] References Cited

UNITED STATES PATENTS

| 2,319,024 | 5/1943 | Wehringer | 285/259 X |
| 3,490,136 | 1/1970 | Stickley | 29/451 X |
| 2,711,331 | 6/1955 | Temple | 285/305 X |

*Primary Examiner*—Dave W. Arola

*Attorney*—Fulwider, Patton, Rieber, Lee & Utecht

[57] ABSTRACT

An integrally formed clamping band is initially offset from an end of an elastomeric hose, with a close fit on the relaxed normal outer diameter of the hose. A nipple, adapted for an interference fit with the bore of the hose, is inserted into the hose end to effect radial expansion of the hose bore. Upon axially opposed forces being applied to the nipple and hose, the outer diameter of the hose is sufficiently contracted for the cylindrical band to be freely movable along the contracted hose into a final clamping position over and around the nipple. Upon relaxation of the tension, the clamping band maintains clamping compression of the embraced section of the hose end of the nipple. In the case of braid reinforced hose, the braided reinforcement radially contracts the elastomeric hose wall material into tighter engagement with the nipple, upon the hose being subjected to tension. As an alternative to inducing tension in the hose, and after the nipple has been inserted into the hose end, the nipple and clamping band may be relatively oppositely moved to effect relative translation of the clamping band into final clamping position.

18 Claims, 3 Drawing Figures

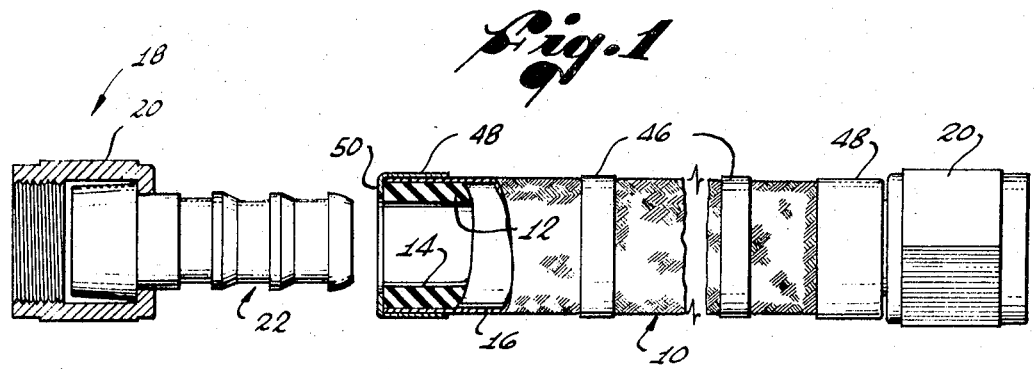
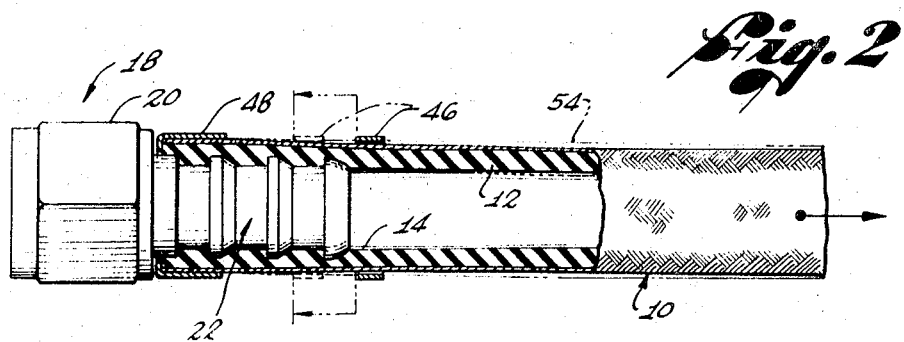
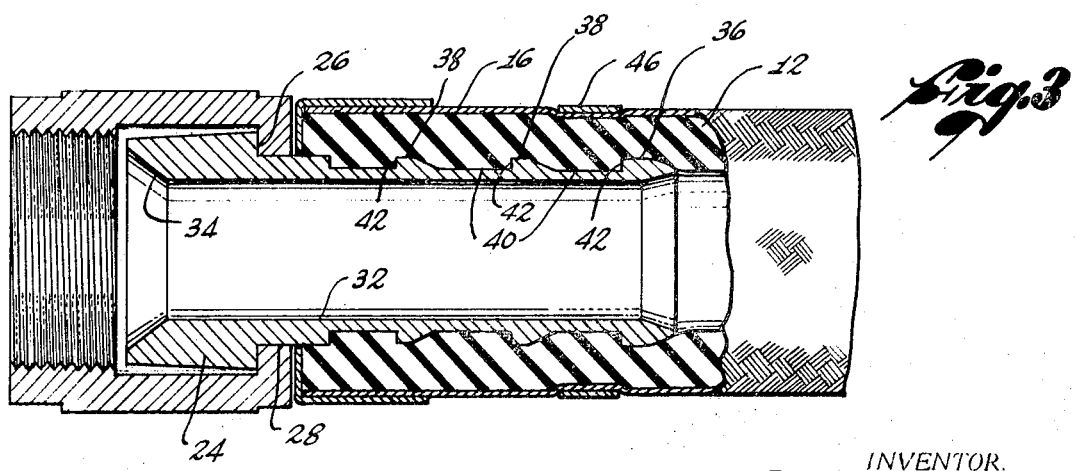

HOSE COUPLING METHOD AND MEANS

BACKGROUND OF THE INVENTION

The present invention relates to an improved method and means for coupling an end of an elastomeric hose to a nipple or the like.

Conventional hose end couplings commonly comprise a serrated nipple inserted into the bore of an elastomeric hose with some form of external split band or screw clamping means to hold the hose end tightly clamped onto the nipple. This arrangement is well known in connection with low, medium and high pressure hoses and couplings in which the hose sometimes may be externally or internally reinforced by a cloth or wire braided material usually wound or woven helically along the length of the hose. However, in all cases of which I am aware, the clamping band takes the form of a split ring that is tightened by some additional mechanical clamping means, or the clamping band is swaged, rolled or otherwise deformed subsequent to being sliped over the hose end, or the hose wall is choked to far less than its original outer diameter in order to effect the degree of clamping required for a secure connection. In none of these cases is there provided any positive means to maintain substantially the original outer diameter of the portion of the hose clamped within the band to confine an optimum amount of the hose wall material in the annulus defined between the band and the nipple around which it is mounted, so as to avoid the danger of rupture of the tube wall.

SUMMARY OF THE INVENTION

The present invention provides an improved method and means for coupling elastomeric hoses to nipples or inserts without the necessity of effecting any deformation or contraction of the band by means of swaging, rolling, mechanical tightening means or the like, or choking of the outer diameter of the hose. The invention provides an integrally formed clamping band, ring or other means having a fixed least diameter approximating the normal outer diameter of the hose on which used. Initially, the clamping means is telescopically mounted on the hose at a position thereon axially spaced from an adjacent end of the hose a distance approximately corresponding to the length of the nipple to be received within the hose end. The nipple is of a size or configuration adapted to provide an interference fit with the hose bore and upon insertion into the bore radially elastically expands the hose end. The means providing the interference fit between the hose bore and nipple are also adapted to hold the parts together upon application of an elastically elongating force to the end portion of the hose. Such elongation constricts the outer diameter of the hose sufficiently for the clamping means to be advanced to a final clamping position over the nipple. In the case of braid reinforced hose, subjecting the nipple mounted hose to tension causes a constriction in diameter in the reinforcing braid envelope to radially constrict and compress the elastomeric material of the hose wall. As an alternative to contracting the hose by tension, in the case of unreinforced or reinforced hose, the clamping means and hose carrying nipple may be relatively oppositely moved for shifting the clamping band to its final clamping position. Preferably, in order to provide an interference fit and to prevent slipping or withdrawal of the hose end from the nipple during the intermediate steps of the process, the nipple is provided with one or more circumferential barbs and the clamping means assumes a final clamping position intermediate an adjacent pair of such barbs.

BRIEF DESCRIPTION OF THE DRAWING

FIG. 1 is a view, partially in axial section, of a hose end fitting and in unassembled relationship, illustrating a preliminary step in the method of this invention.

FIG. 2 is a view, partially in axial section, of an intermediate step in making the hose connection, with the fitting and hose end interconnected.

FIG. 3 is a view, on an enlarged scale, showing the finally assembled fitting and hose.

DESCRIPTION OF THE PREFERRED EMBODIMENT

The method of this invention is applicable to reinforced and unreinforced flexible hoses made of an elastomeric material, e.g., natural or synthetic rubber, or synthetic plastic materials such as, for example, the tetrafluorethylene resin known under the DuPont trademark of Teflon. In any event, reinforced and unreinforced hoses are commercially available in a variety of inner and outer diameters and wall thicknesses which, while nominally the same, nevertheless vary at least within the tolerances of the several manufacturers thereof. Conventional clamping means radically constrict the outer diameter of the hose which action, especially in the case of thin-walled hose mounted on a serrated nipple, may result in excessive deformation of the hose wall material and, perhaps, cutting thereof, resulting in an insecure mechanical connection which will also be productive of fluid leakage. The present invention provides clamping means for positively maintaining the original outer diameter of the clamped section of the hose and, in use with serrated nipples, provides a means of accurately locating the clamping means with respect to the barbs on the nipple to avoid cutting through the tube wall.

Referring to the drawing, an illustrative hose, generally designated by the numeral 10, comprises an inner tube 12 defining a bore 14 of predetermined size for conducting the fluids therethrough. The hose 10 frequently is reinforced by a helically woven layer or layers of braided material. In the illustrated embodiment, the reinforcement comprises a sheath 16 of woven wire braid, preferably having its strands partially embedded within the outer surface of the elastomeric material of the hose. However, it will be understood that the reinforcement layer may comprise a separate sheath of wire or cloth braid, closely embracing the relaxed normal outer diameter of the inner tube 12. The reinforcement may also take the form of a tubular layer of braid relatively deeply embedded within the wall of the inner tube 12. In any event, the relationship of the reinforcement layer of braided material and the orientation of the strands thereof to the tube 12 should be such that, upon a section of the hose 10 being subjected to opposed axial forces, a reduction in outer diameter of the hose 10 is effected.

The invention may be employed with a wide variety of hose insert or nipple configurations. By way of example, the drawings show an end fitting 18 comprising an assembly of a coupling nut 20 and a nipple designated generally by the numeral 22. As is best seen in FIG. 3, the nipple 22 is formed at one end with a head portion 24, of enlarged diameter, adapted for reception within the coupling nut 20, the latter being formed with a radially inwardly directed flange defining a shoulder 26 for seating the nipple head. The radially inner edge of the nut flange defines a bore 28 to rotatably seat the coupling nut upon a cylindrical section 30, of smaller external diameter than the nipple head 24.

The nipple 22 is formed with an axial bore 32 which, in the head end 24, develops into a conically tapered seat 34 adapted for the reception of a conventional fluid sealing means (not shown) upon the coupling nut 20 being threaded onto the member to which the hose assembly is to be secured. Externally, that portion of the nipple 22 protruding out of the coupling nut 20 is adapted for an interference fit with the normal, unstressed inner diameter of the inner tube 12, in order that when the end of the hose 10 is slipped over the nipple, the elastomeric material of the inner tube 12 will be radially compressed between the reinforcement 16 and the outer surface of the nipple. Such interference may take a wide variety of forms, for example, a tapered or cylindrical outer surface of the nipple exceeding the diameter of the hose bore 14, or thread-like, circumferentially extending, circumferentially and/or axially spaced external enlargements on the nipple 22.

Preferably, the nipple 22 is formed with a tapered nose 36 and a plurality of axially spaced circumferentially extending flanges 38, between cylindrical sections or lands 40, the latter being of approximately the same or slightly larger diameter than the diameter of the hose bore 14. Those edges of the nose 36 and flanges 38 facing the coupling nut 20 are preferably barb-like, for example, as defined by right angular shoulders 42, while the other sides taperingly converge in the opposite direction.

Referring now to FIG. 1, the hose 10 is shown in its unstressed, full normal diameter configuration and mounts a clamping means 46, axially spaced from the adjacent end of the hose, preferably, by a distance at least as great as the exposed length of the nipple 22. The clamping means 46 is circumferentially continuous, integral section that may take the form of a cylinder of essentially inelastic material, preferably metallic, to provide sufficient hoop strength, during assembly and when in final position, to prevent radial expansion of that portion of the hose 10 positively enclosed by the band. The axial dimension of the band 46 may vary within a very wide range, proportionally to the size of nipple and hose on which the clamping band or ring is to be mounted. In the illustrated embodiment, the clamping band 46, preferably, is of an axial length slightly less than the axial distance of the land 40 between the pair of adjacent flanges 38 around which the band is desired to be positioned.

The inner diameter of the clamping band 46 may define a closely sliding, tightly embracing, or slight interference fit with the relaxed diameter of the relaxed hose 10. The band can inexpensively be made with its least diameter to precisely the desired size, to close tolerances, for the kind of fit desired for the particular hose and nipple under consideration. A close sliding fit is preferred whereby the band 46 may be slipped over the end of the hose 10 and moved into the position shown in FIG. 1 without having to first contract the normal diameter of the hose 10 by subjecting it to tension. After the band 46 has been placed on the hose 10, a cap ferrule 48, integrally formed with a radially inwardly extending annular flange 50, is placed over the end of the hose. The inner diameter of the cylindrical portion of the cap 48 may have a loose or tight fit with the outer diameter of the hose 10, since it is not critical to the mode of coupling of this invention. The inner edge of the flange 50 of the cap defines an opening adapted to be slidably received on the cylindrical section 30 of the nipple 22.

After the parts have initially been brought into alignment, as shown in FIG. 1, the hose 10 and nipple 22 are first telescoped together, until the protective end cap 48 has its flange 50 against or closely adjacent to the opposed end of the coupling nut 20. It will be appreciated that, due to the interference between the exterior of the nipple 20 and the bore 14 of the inner tube 12, the two parts must be forced together in order to fully telescope them. When the parts are thus initially joined, the clamping band 46 remains in substantially the same position relative to the end of the hose 10 as it occupied in FIG. 1, while that portion of the hose 10 which is now mounted on the nipple 22 may be about the same or slightly larger in overall diameter, as compared to its original diameter, as is indicated by the phantom outline outer diameter configuration 54 in FIG. 2. The axial volume of the elastomeric material of the inner tube 12 between the reinforcement braid 16 and the exterior of the nipple 22 is now radially compressed between these two elements.

Next, axially opposed forces are imposed on the assembly as, for example, by clamping the coupling nut 20 in a vise or the like and manually or otherwise pulling outwardly on the hose 10 at a place beyond the position of the clamping band 46. As a result of these opposed forces, the reinforcement braid 16 is constricted whereby the outer diameter of the hose 10 is reduced over a substantial portion of its length from, at least, that portion of the hose end within the protective end cap 48 to the point of application of a pulling force to the outer end of the hose 10. During the application of this force the interference fit of the nipple 22 in the bore 14 of the inner tube 12 and, particularly, the barb-like configuration of the shoulder 42 of the nipple, prevents separation of the hose from the nipple. The hose now being reduced in diameter, as shown by the solid outline configuration in FIG. 2, the hose is necked down sufficiently over a sufficient portion of its axial length to provide a close, loose or easily sliding fit between the inner diameter of the band 46 and exterior of the hose and the band is now moved to its final position between the nose flange 36 and adjacent flange 38, as indicated in the phantom outline position of the band in FIG. 2.

Referring to FIG. 2, as the band 46 is moved between the solid and phantom outline positions, its passage over the nose flange 36 can be sensed. As will be apparent, the radial clearance between the inner diameter of the band 46 and the outer diameters of the nose flange 36 and adjacent flange 38 is restricted as compared to the radial clearance between the inner diameter of the band and the land 40 between these two flanges. As a result, once the band 46 has been moved over the nose flange 36 and into annulus defining relationship with the land 40, the greater radial compression of the elastomeric material appearing over the peaks of the barbed flanges provides resistance to axial displacement of the band 46 out of registration with the land 40. The band 46 is, in effect, self-centering with respect to any one of the lands 40.

FIG. 3 illustrates the finally assembled configuration and relationship of the parts. For clarity of illustration, that portion of the hose 10 surrounded by the band 46 appears to be necked down but is actually of an outer diameter positively defined by the inner diameter of the band 46 and, therefore, substantially the same as the original outer diameter of the hose in the unstressed condition of FIG. 1. At the same time, those portions of the hose 10 axially adjacent to the band 46 may be slightly larger in outer diameter than the original outer diameter of the hose because of expansion by the nipple.

While only one band 46 is shown, it will be appreciated that a plurality of such bands could be employed or a plurality of rings of circular cross-section, all of which could be simultaneously or sequentially slid into final adjacent or spaced positions around the nipple 22 during the state of contraction of the hose illustrated in FIG. 2. The resulting clamp provides not only an effective mechanical lock against detachment of the hose 10 from the nipple 22 but, also, a very affective fluid tight seal which is effective against high as well as medium fluid pressures. The external appearance of the completed coupling is shown at the right hand side of FIG. 1.

The method just described may be employed with unreinforced elastomeric hose. In such case, the end portion of the unreinforced hose, upon being mounted on the nipple 22, is expanded in outer diameter as well as inner diameter. Then, if necessary, a temporary split band clamp or the like may be mounted around the end of the hose immediately adjacent the coupling nut 20, to prevent detachment of the hose from the nipple while the hose is subjected to tension. Upon the hose being elastically elongated, it undergoes a reduction in outer diameter whereby the band 46 may be advanced to final clamping position in the manner just described.

In an alternative mode of operation, instead of the hose (whether of the reinforced or unreinforced type) being elastically elongated in order to reduce its diameter, the band 46 and nipple 22 may be relatively oppositely moved towards one another without going through the contracting step. More particularly, the band 46 is initially mounted on the hose, at a location spaced from the adjacent end of the hose, leaving a hose end portion corresponding in length to the length of the nipple to be inserted within the hose end. Then, the hose 10, for example, is engaged with the nipple 22 in the manner previously described, bringing the parts into the relationship illustrated in FIG. 2. It will be observed that the band 46 in its solid outline position is now positioned immediately adjacent to or around the end of the nipple 22. Now, instead of subjecting the hose to tension, the band 46 may be held stationary and the nipple 22 forced inwardly of the band until the parts are sufficiently relatively moved for the band 46 to assume the final clamping position illustrated in the phantom outline position of FIG. 2. As before, the relative movement of the band 46 and nose flange 36 may be sensed and the self-centering action occurs. While during the pushing of the nipple 22 into the band 46, some columnar compression and, therefore, a tendency towards radial expansion of the outer diameter of the hose 10, occurs, the hoop strength of the band 46 positively confines that section of the hose 10 passing therethrough to the desired diameter.

As has been pointed out above, the method of this invention is applicable to a wide variety of configurations of fittings and types of hoses and, also, employs a mechanical clamping means which may be embodied in a variety of forms. Other variations of the method and clamping means within the purview of the invention may occur to persons skilled in the art, it being understood that the foregoing specific embodiments are by way of illustration and not limitation.

I claim:

1. The method of coupling an end portion of an elastomeric hose to a nipple comprising:
   positively defining an unyielding rigid endless clamping surface of a diameter in substantially continuous circumferential contact with the outer diameter of the hose, while the hose is relaxed, at an initial location axially spaced from the adjacent end of the hose by, at least, the length of the nipple;
   telescopically joining the nipple and the end of the hose to effect elastic deformation of the inner diameter of the hose into close, substantially conforming, constrictive engagement with the nipple;
   and oppositely relatively moving the nipple and clamping surface to relatively translate the unyielding clamping surface into annulus-defining relationship to the nipple to radially compress a circumferential portion of the hose within the annulus and within positive external limits defined by the diameter of the unyielding surface.

2. The method of claim 1 in which an elastically elongating force is applied to the end portion of the hose to constrict the outer diameter of the hose, while concurrently maintaining the hose end on the nipple,
   thereafter, moving the clamping surface axially of the constricted hose into the annulus-defining relationship with the nipple,
   and, thereafter, releasing the elongating force to effect radial compression of a circumferential portion of the hose in the annulus.

3. The method of claim 2 in which expansion of the outer diameter of the end portion of the hose is yieldably resisted throughout the circumference and length of the end portion of the hose in order to radially compress the hose against the nipple upon inserting the nipple into the end of the hose.

4. The method of claim 1 in which the clamping surface is initially located at a position axially spaced from the adjacent end of the hose to define an end portion of the hose of the length of the nipple to be received therein,
   thereafter, internally elastically expanding the inner diameter of the hose by inserting the nipple into the end of the hose for positioning the inner end of the nipple closely adjacent the clamping surface;
   and, thereafter, rigidly holding the clamping surface in a stationary position while concurrently forcing the nipple and the end portion of the hose carried thereby inwardly of the clamping surface for a predetermined axial length of the hose end portion.

5. The method of coupling an end portion of an elastomeric hose to a nipple comprising:
   telescopically joining the nipple and the end of the hose to effect elastic deformation of the inner diameter of the hose into tightly constricting engagement with the nipple;
   applying an elastically elongating force to the end portion of the hose to reduce the outer diameter of the hose and to effect radial compression of the hose on the nipple for maintaining the hose end on the nipple;
   positioning an integral endless clamping surface, of an unyielding internal diameter at least slidably exceeding the reduced outer diameter of the hose, around the constricted hose and over the nipple;
   and, thereafter, releasing the elongating force to effect radial compression of a circumferential portion of the hose in the annulus defined between the unyielding clamping surface and the nipple.

6. The method of claim 5 in which expansion of the outer diameter of the end portion of the hose is yieldably resisted throughout the circumference and length of the end portion of the hose in order to radially compress the hose against the nipple upon inserting the nipple into the end of the hose.

7. The method of claim 5 in which:
   the clamping surface is rigidly defined prior to inserting the nipple into the end of the hose and, initially, around the end portion of the hose at a position spaced from the end of the hose,
   to be subsequently translated axially of the hose, during the step of applying an elastically elongating force to the hose to constrict the outer diameter of the hose, to a position around the nipple.

8. The method of claim 7 in which the clamping surface is initially defined, prior to mounting on the hose, of a diameter to closely embrace the outer diameter defined by the hose when the hose is in a substantially relaxed state, and thereafter, telescopically mounted around the hose at the position spaced from the end of the hose.

9. A quick connecting hose comprising:
   a flexible hose made of an elastomeric material;
   a hose reinforcing means, extending cylindrically continuously for the length of said hose, that is yieldably reduced in diameter in response to tension being imposed thereon;
   a cylindrical wall portion, at least, of said hose being contained within said reinforcing means to be radially contracted by tension in said reinforcing means;
   and a rigid, unyielding, annular clamping means mounted around said hose,
   said clamping means having an inner diameter in circumferential substantially continuous contact with the normal diameter of said hose before and after a nipple is inserted into the hose and clamped thereto by said clamping means,
   whereby, upon a nipple having been inserted in an end of said hose to expansively stress said hose, tension may be applied to said reinforcing means to constrict said hose to less than normal diameter and said clamping means can be freely moved axially of said hose to a clamping position over the nipple in order to rigidly confine and clamp a circumferential portion of said hose against the nipple, after release of such tension.

10. A hose assembly as in claim 9 in which said hose reinforcing means comprises a mesh of helically braided strands of material.

11. A hose assembly as in claim 10 in which said mesh is in contact with the outer diameter of said hose and is adapted to yieldably resist expansion of said hose beyond its normal diameter.

12. A hose assembly as in claim 10 in which said reinforcing means comprises a mesh of metallic strands embedded, at least partially, in the elastomeric material of said hose.

13. A hose assembly as in claim 9 in which said clamping means has a part, at least, of its inner diameter in cylindrical configuration and adapted for sliding engagement with the normal outer diameter of said hose.

14. A hose assembly as in claim 9 in which said clamping means has a part, at least, of its inner diameter in cylindrical configuration and adapted for frictional clamping engagement with the normal outer diameter of said hose.

15. In a coupling having a braid reinforced elastomeric hose mounting a nipple in one end thereof, the improvement comprising:
   means on the outer and inner diameters of the nipple and the hose, respectively, forming an interference fit between the hose and nipple which elastically internally expands, the portion of the hose on the nipple, said means also resisting axial separation of the hose from the nipple when the hose is subjected to tension induced by pulling on the braid reinforcement of the hose;

and unyielding integrally formed rigid annular clamping means positioned over the nipple, said clamping means having an inner diameter, prior to and after positioning over the nipple, substantially equal to the normal outer diameter of the hose, said clamping means being slidable to a position over the nipple when the outer diameter of the hose portion is contracted to normal, at least, by tension in the braid reinforcement of the hose.

16. The improvement as in claim 15 in which said interference means comprises a plurality of axially spaced apart circumferential ridges externally formed on said nipple and having diameters in excess of the normal inner diameter of the hose.

17. The improvement as in claim 16 in which said clamping means comprises a cylindrical band having an axial length of at least the axial dimension of one of said flanges.

18. The improvement as in claim 16 in which said clamping means comprises a cylindrical band having an axial length less than the axial dimension between corresponding points of adjacent ones of said axially spaced apart ridges.

* * * * *